(12) United States Patent
Beaty et al.

(10) Patent No.: US 9,379,897 B1
(45) Date of Patent: *Jun. 28, 2016

(54) METHOD AND APPARATUS FOR PROVIDING AN INTERACTIVE HIERARCHICAL ENTITLEMENT MAP

(71) Applicant: Bank of America Corporation, Charlotte, NC (US)

(72) Inventors: Sean Beaty, Charlotte, NC (US); Cheryl Ledoux, Charlotte, NC (US); Chad B. Vought, Monroe, NC (US); Lynette M. Galvan, San Francisco, CA (US); Mark T. Hudson, Charlotte, NC (US); Kimberly L. Lewis, Atlanta, GA (US); Cary Hudgins, Charleston, SC (US); Shelvia Barry, Greensboro, NC (US); Gerardo R. Garcia, Charlotte, NC (US); Aimee Jones, Tarpon Springs, FL (US); Michelle D. Nichols, Rock Hill, SC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/615,493

(22) Filed: Feb. 6, 2015

(51) Int. Cl.
| | |
|---|---|
| G06F 21/00 | (2013.01) |
| H04L 9/32 | (2006.01) |
| G06F 17/30 | (2006.01) |
| G06Q 10/10 | (2012.01) |
| G06F 21/30 | (2013.01) |

(52) U.S. Cl.
CPC .......... *H04L 9/3247* (2013.01); *G06F 17/3053* (2013.01); *G06F 17/30867* (2013.01); *G06F 21/30* (2013.01); *G06Q 10/10* (2013.01)

(58) Field of Classification Search
CPC ......... G06F 21/45; G06F 21/30; G06F 21/33; G06F 21/335; G06F 21/62; H04L 9/32; H04L 9/3247
See application file for complete search history.

(56) References Cited

U.S. PATENT DOCUMENTS

| | | | |
|---|---|---|---|
| 5,675,782 A | 10/1997 | Montague et al. | |
| 7,467,414 B2 | 12/2008 | Schlesinger | |
| 7,607,164 B2 | 10/2009 | Vasishth et al. | |
| 7,797,239 B2 | 9/2010 | Smith | |
| 7,921,288 B1 | 4/2011 | Hildebrand | |
| 8,037,525 B2 | 10/2011 | Stephenson et al. | |
| 8,099,503 B2 | 1/2012 | Yeates et al. | |
| 8,132,231 B2 | 3/2012 | Amies et al. | |
| 8,271,387 B2 | 9/2012 | Pieper et al. | |
| 8,385,385 B2 | 2/2013 | Michaels et al. | |
| 8,386,388 B2 | 2/2013 | Schlesinger et al. | |
| 8,438,611 B2 | 5/2013 | Faitelson et al. | |
| 8,438,612 B2 | 5/2013 | Faitelson et al. | |

(Continued)

*Primary Examiner* — Edward Zee
(74) *Attorney, Agent, or Firm* — Weiss & Arons LLP; Michael A. Springs, Esq.

(57) ABSTRACT

A method for maintaining a list of authorized signatories is provided. The method may include displaying a hierarchal list of signatories with at least one entitlement authorization. The method may further include receiving, from the client, a modification to the at least one entitlement authorization. The method may extract, from one or more client documents, a signature of a signatory with entitlement authorization. The method may receive a command to hover, on a Graphical User Interface ("GUI"), over the signatory. In response to the hovering, the may display, preferably on a hierarchal display, in response to the hovering, a copy of the signature of the signatory, a hierarchal list of signatories with current entitlement authorization, and a listing of documents signed by each of the signatories.

18 Claims, 6 Drawing Sheets

(56) References Cited

U.S. PATENT DOCUMENTS

| | | |
|---|---|---|
| 8,458,337 B2 | 6/2013 | Corley et al. |
| 8,490,152 B2 | 7/2013 | Staiman et al. |
| 8,578,507 B2 | 11/2013 | Faitelson et al. |
| 8,590,037 B2 | 11/2013 | Altay et al. |
| 2005/0055306 A1* | 3/2005 | Miller .................... G06Q 40/04 705/37 |
| 2014/0181003 A1 | 6/2014 | Kling et al. |

* cited by examiner

US 9,379,897 B1

METHOD AND APPARATUS FOR PROVIDING AN INTERACTIVE HIERARCHICAL ENTITLEMENT MAP

FIELD OF TECHNOLOGY

This application relates to displays of hierarchical maps. Specifically, this application relates to displays of hierarchical maps.

BACKGROUND OF THE DISCLOSURE

Hierarchical maps may be used to show entity hierarchies.

Entity hierarchy maps may graphically display the change of command—i.e., order of responsibilities—within an entity. However, hierarchical maps are typically limited to showing high-level orders of information.

It would be desirable for hierarchical maps to show more detailed information.

It would also be desirable for hierarchical maps to be used as forensic determiners of an individual's effect on an organization.

It would be yet more desirable to utilize hierarchal maps to conduct investigations of fraudulent activities.

SUMMARY OF THE INVENTION

A method for providing a hierarchal client entitlement map is disclosed herein. The method may include querying a list of entitlements for a client. The method may also display the list of entitlements for the client. The list may include a list of signatories with entitlement authorization. The method may further include receiving, from the client, entitlement authorization for a signatory and adding the signatory to the list. The method may link the signatory to one or more signature documents associated with the signatory's authorization. When the method receives a modification to the client information, the method may transmit the modification, independent of any human input, to a System of Record. Such transmission may occur preferably only if the modification is input by the signatory. Preferably thereafter, the method may transform, when received by the System of Record, the modified client information into updated client information reflecting the modification.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
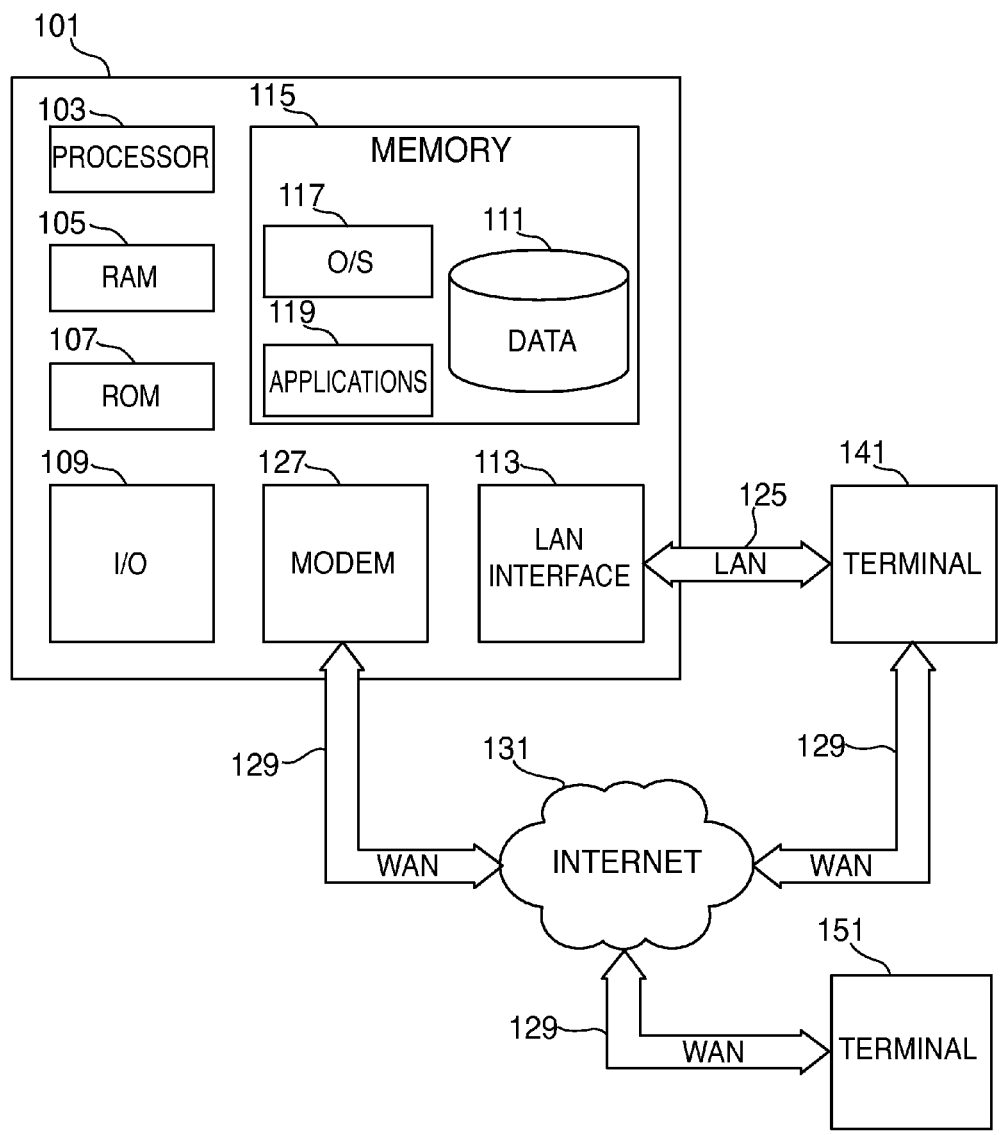
FIG. 1 shows an illustrative apparatus in accordance with principles of the invention.

Apparatus, methods and media (collectively referred to herein as a "system") for providing a hierarchal client entitlement map are provided.

For the sake of illustration, the invention will be described as being performed by a "system." The "system" may include one or more of the features of the apparatus and methods that are shown or described herein and/or any other suitable device or approach. The "system" may be provided by an entity. The entity may be an individual, an organization or any other suitable entity.

The system may query a list. The list may include a list of entitlements. The entitlements may include entitlements for a client. The list may be a list for a client.

The system may display the list. The list may be displayed for the client. The list may include a list of signatories. The signatories may include signatories with authorization. The authorization may include entitlement authorization.

The system may receive authorization. The authorization may be received from the client. The authorization may be entitlement authorization for a signatory. The system may add the signatory to the list.

The system may link the signatory. The signatory may be linked to one or more documents. The documents may be signature documents. The signature documents may be associated with the signatory's authorization.

The system may receive a modification. The modification may be a modification to information. The information may be client information.

The system may transmit the modification. The modification may be transmitted if the modification is input by the signatory. The modification may be transmitted only if the modification is input by the signatory. The modification may be input independent of any input. The modification may be transmitted to a System of Record. The modification may be transmitted to the System of Record without any human input.

The system may transform the modified client information. The system may transform the information upon receipt by the System of Record. The information may be transformed into updated client information. The updated information may reflect the modification.

The signatory may be a first signatory. The first signatory may be provided with an entitlement level. The entitlement level may be a first entitlement level. The first entitlement level may correspond to the first signatory.

The signatory may be a second signatory. The second signatory may be provided with an entitlement level. The entitlement level may be a second entitlement level. The second entitlement level may correspond to the second signatory.

The first signatory may be identified on the list of signatories. The second signatory may be identified on the list of signatories. The first signatory and/or the second signatory may be identified on the list of signatories as authorized to modify documents. The documents may be client documents.

The signatories may be identified on the list of signatories as authorized to submit changes. The changes may include changes to documents. The documents may include client documents.

The modification to the documents may be transmitted using any known and available methods. The modification to the documents may be transmitted using Straight Through Processing. The modification may be transmitted without human intervention.

The client information may be transmitted in any suitable form. The client information may be transmitted in batch form. The client information may be transmitted in paragraph form.

The system may be configured for providing signatory maintenance.

The system may display a list. The list may be a hierarchal list. The hierarchal list may be a list of signatories. The list of signatories may include at least one authorization. The authorization may be an entitlement authorization.

The system may receive a modification. The modification may be received from the client. The modification may include a modification at least one entitlement authorization.

The system may extract a signature. The signature may be extracted from one or more documents. The documents may be client documents. The signature may be a signature of a signatory. The signatory may be associated with entitlement authorization. The signatory may have previously been granted entitlement authorization.

The system may include a Graphical User Interface ("GUI"). The system may include a display. The system may display signatory information upon the GUI.

The system may hover over signatory information on the GUI. The system may hover over the signatory on the GUI.

The system may display information on the display. The display may be a hierarchal display. The information may be displayed on the hierarchal display in response to the hovering.

The system may display a copy of the signature of the signatory. The copy of the signature of the signatory may be displayed in response to the system hovering over the signatory on the GUI.

The system may display a list. The list may be a list of signatories. The list of signatories may be a hierarchal list of signatories. The list of signatories may include signatories with authorization. The authorization may be entitlement authorization. The entitlement authorization may be current entitlement authorization. The hierarchal list of signatories may be displayed in response to the system hovering over the signatory on the GUI.

The system may display a listing of documents. The listing of documents may be a list of documents signed by a signatory. The listing of documents may be a list of all documents signed by a signatory. The listing of documents may include a list of documents signed by each of the signatories. The listing of documents may be displayed in response to the system hovering over the signatory on the GUI.

The system may receive a change. The change may be a change of entitlement. The entitlement may be entitlement for a signatory. In response to a change of entitlement for a signatory, the system may remove the signatory. The signatory may be removed as an authorized signor. The signatory may be removed from an authorized signor database.

The system may include a selectable display. The listing of documents may include the selectable display. The selectable display may include a display of documents signed by the signatory.

An exemplary embodiment is now provided. The system may provide a hierarchal entitlement map. The system may query a list. The list may include a list of entitlements. The list may be a list for a client. The entitlements may include client entitlements.

The system may include a display. The display may be configured to display the list. The list may be displayed for the client. The list may include a list of signatories. The signatories may be granted authorization. The authorization may include entitlement authorization.

The system may receive entitlement authorization. The authorization may be an authorization of entitlement for a signatory. The authorization may be received from the client.

The system may receive a request. The request may include a request to add the signatory. The request may include a request to add the signatory to the list.

The system may receive a modification. The modification may include a modification to the client information.

The system may transmit the modification. The modification may only be transmitted if the modification is input by the signatory. The modification may be transmitted independent of human input. The modification may be transmitted to a System of Record.

The system may link the signatory. The signatory may be linked to one or more signature documents. The one or more signature documents may be associated with the signatory's authorization.

The system may transform the modified client information. The modified client information may be transformed only when received by the System of Record. The modified client information may be transformed into updated client information. The updated client information may reflect the modification.

The signatory may be a first signatory. The signatory may be a second signatory. The signatories may be identified on the list of signatories. The signatories on the list of signatories may be authorized to modify client documents.

The signatories on the list of signatories may be authorized to submit changes to client documents.

The modification to client information may be transmitted using Straight Through Processing. The modification to client information may be transmitted without human intervention.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

FIG. 1 is an illustrative block diagram of system 100 based on a computer 101. The computer 101 may have a processor 103 for controlling the operation of the device and its associated components, and may include RAM 105, ROM 107, input/output module 109, and a memory 115. The processor 103 will also execute all software running on the computer—e.g., the operating system. Other components commonly used for computers such as EEPROM or Flash memory or any other suitable components may also be part of the computer 101.

The memory 115 may be comprised of any suitable permanent storage technology—e.g., a hard drive. The memory 115 stores software including the operating system 117 any application(s) 119 along with any data 111 needed for the operation of the system 100. Alternatively, some or all of computer executable instructions may be embodied in hardware or firmware (not shown). The computer 101 executes the instructions embodied by the software to perform various functions.

Input/output ("I/O") module may include connectivity to a microphone, keyboard, touch screen, and/or stylus through which a user of computer 101 may provide input, and may also include one or more speakers for providing audio output and a video display device for providing textual, audiovisual and/or graphical output.

System 100 may be connected to other systems via a LAN interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program(s) 119, which may be used by computer 101, may include computer executable instructions for invoking user functionality related to communication, such as email, Short Message Service (SMS), and voice input and speech recognition applications.

Computer 101 and/or terminals 141 or 151 may also be devices including various other components, such as a battery, speaker, and antennas (not shown).

Terminal 151 and/or terminal 141 may be portable devices such as a laptop, cell phone, Blackberry™, or any other suitable device for storing, transmitting and/or transporting relevant information. Terminals 151 and/or terminal 141 may be other devices. These devices may be identical to system 100 or different. The differences may be related to hardware components and/or software components.

Figure 2:
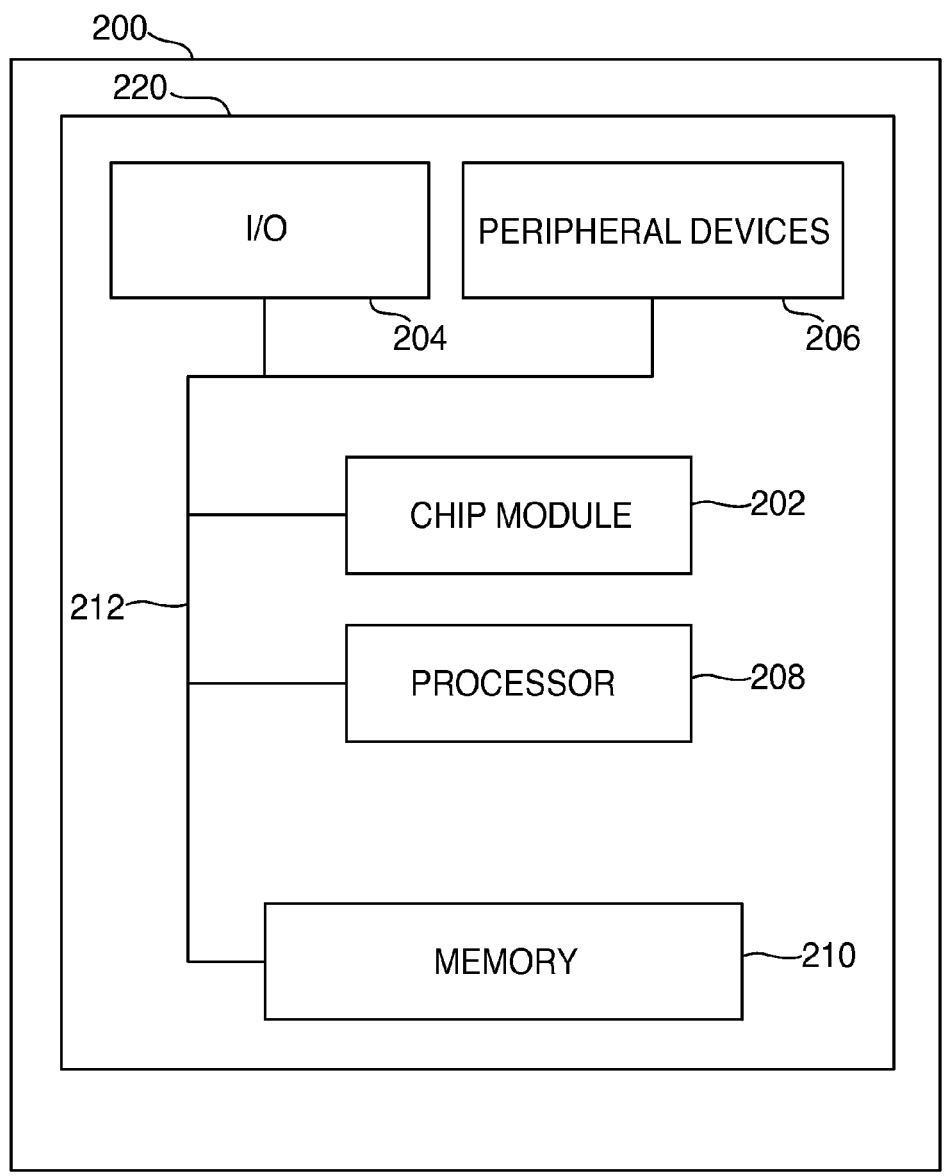
FIG. 2 shows an illustrative apparatus in accordance with the principles of the invention.

FIG. 2 shows illustrative apparatus 200. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute data structural information, structural parameters of the data and/or determine signatory entitlement requirements and machine-readable memory 210.

Machine-readable memory 210 may be configured to store in machine-readable data structures: information pertaining to a signatory, information pertaining to an administrator of the repository and the signatories which he may oversee, the current time, information pertaining to historical entitlements, information relating to current regulations, rules and/or statutes relating to account compliance and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
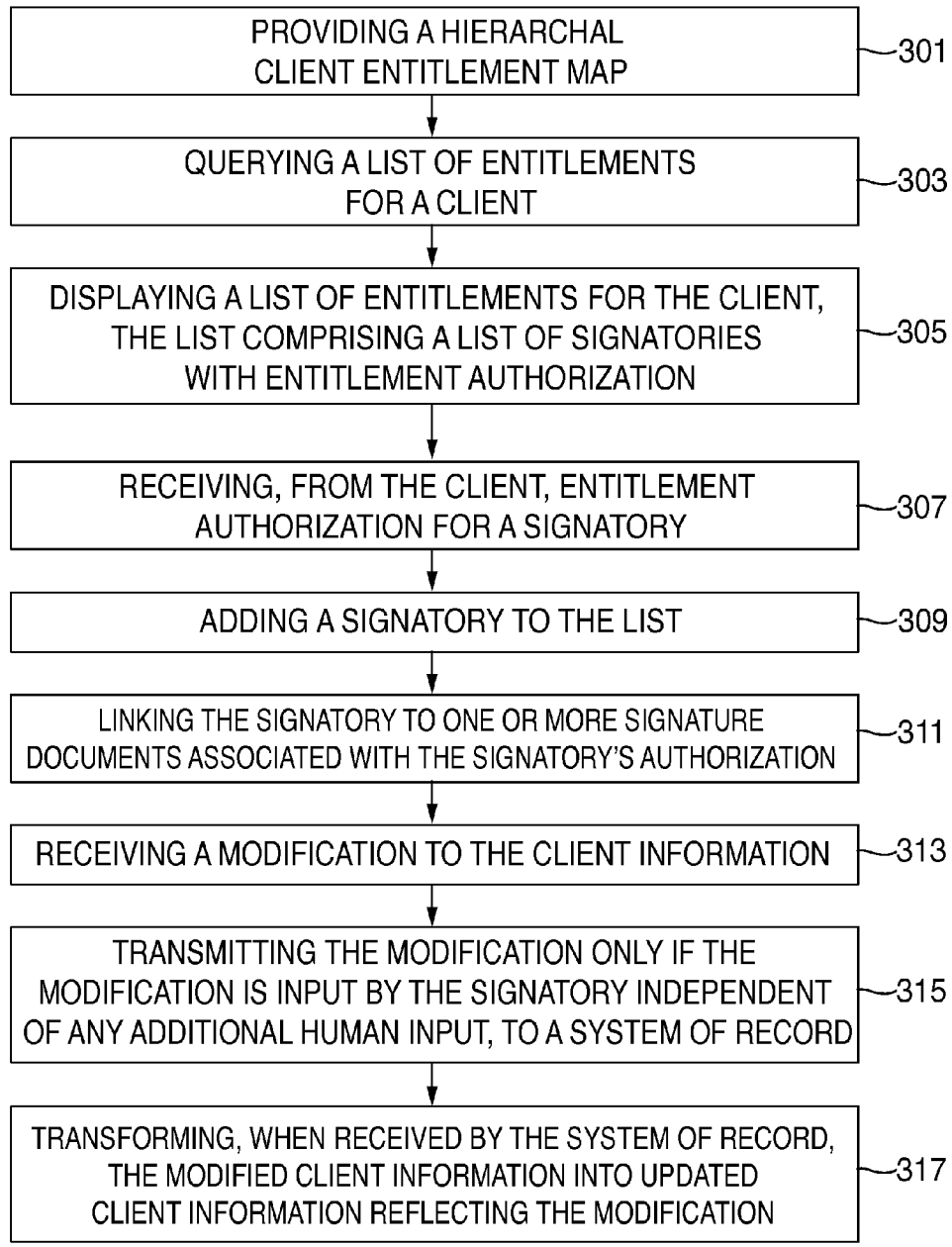
FIG. 3 shows an illustrative flow diagram according to certain embodiments.

FIG. 3 shows illustrative process 301 for providing a hierarchal client entitlement map.

Process 301 may begin at step 303. At step 303, the system may query a list. The list may include a list of entitlements. The entitlements may be entitlements for a client. The list may be queried for a client.

At step 305, the system may display the list of entitlements. The list of entitlements may be displayed for the client. The list may include a list of signatories. The signatories may be signatories with authorization. The authorization may include entitlement authorization.

At step 307, the system may receive entitlement authorization. The entitlement authorization may be received from the client. The entitlement authorization may be authorization for a signatory.

At step 309, the system may add a signatory. The signatory may be added to the list.

At step 311, the system may link the signatory. The signatory may be linked to one or more signature documents. The one or more signature documents may be associated with the signatory's authorization.

At step 313, the system may receive a modification. The modification may include a modification to client information.

At step 315, the system may transmit the modification. The modification may be transmitted preferably only if the modification is input by the signatory. The modification may be transmitted independent of any additional human input. The modification may be transmitted to a System of Record.

At step 317, the system may transform the client information. The system may transform the client information into modified client information. The system may transform the information when received by the System of Record. The system may transform the information into updated client information. The updated client information may reflect the modification.

Figure 4:
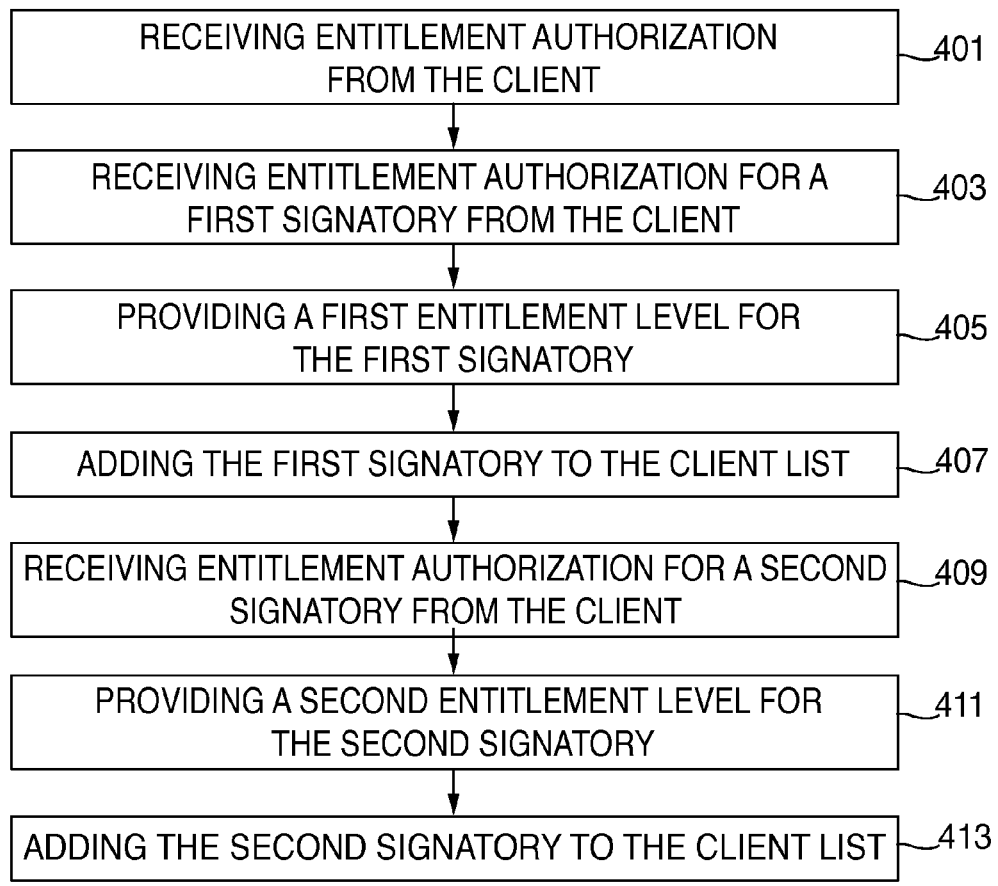
FIG. 4 shows another illustrative flow diagram in accordance with the principles of the invention.

FIG. 4 shows illustrative process for receiving entitlement authorization from a client.

The process may begin at step 401. At step 401, the system may receive authorization. Authorization may be received from the client. The authorization may be entitlement authorization.

At step 403, the system may receive entitlement authorization. The entitlement authorization may be received for a signatory. The signatory may be a first signatory. The entitlement authorization may be received from the client.

At step 405, the system may provide an entitlement level. The entitlement level may be a first entitlement level. The entitlement level may be associated with the first signatory. The first entitlement level may be the entitlement level of the first signatory.

At step 407, the system may add the first signatory to the client list.

At step 409, the system may receive entitlement authorization. The authorization may correspond to a second signatory. The authorization for the second signatory may be received from the client.

At step 411, the system may provide a second entitlement level. The second entitlement level may be associated with the second signatory. The second entitlement level may be the entitlement level of the second signatory.

At step 413, the system may add the second signatory the client list.

Figure 5:
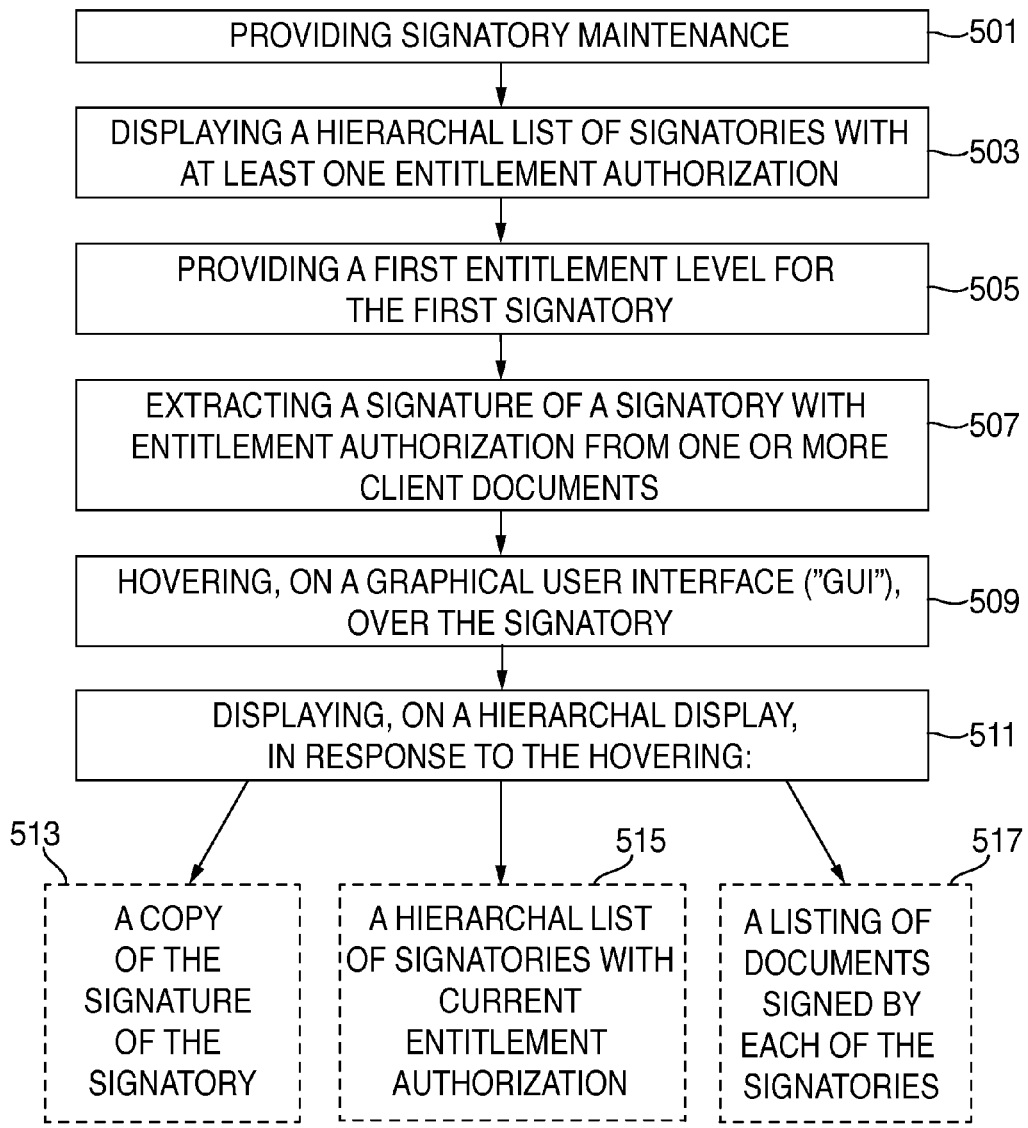
FIG. 5 shows yet another illustrative flow diagram in accordance with the principles of the invention.

FIG. 5 shows illustrative process 501 for providing signatory maintenance.

Process 501 may begin at step 503. At step 503, the system may display a list. The list may be a hierarchal list. The list may be a list of signatories. The signatories may be associated with at least one authorization. The authorization may include entitlement authorization.

At step 505, the system may provide an entitlement level. The entitlement level may be a first entitlement level. The entitlement level may be an entitlement level for a first signatory.

At step 507, the system may extract a signature. The signature may be the signature of a signatory. The signatory may have entitlement authorization. The signatory signature may be extracted from one or more documents. The documents may be client documents.

At step 509, the system may include a GUI. The GUI May display information. The GUI may display a pointer. The pointer may hover. The pointer may hover over the signatory information. The pointer may be displayed on the hierarchal map. The pointer may be displayed hovering over the signatory within the hierarchal map.

At step 511, the system may display information on a hierarchal map display. The information may be displayed in response to the hovering.

At step 513, the system may display a signature. The signature may be a copy of a signature. The signatory may be the signature of a signatory. The signatory may be the stored signature of a signatory.

At step 515, the system may display a list. The list may be a hierarchal list. The hierarchal list may be a list of signatories. The list may include a list of signatories with entitlement authorization. The entitlement authorization may be current entitlement authorization.

At step 517, the system may display a listing of documents. The listing may include documents signed by each of the signatories.

It should be noted that the information that is displayed in response to the hovering, such as the information in any one of steps 513, 515 and/or 517 may be shown in the alternative—i.e., only the information in one of 513, 515 or 517—or some combination of the information in two or more of 513, 515 or 517 may be shown, without departing from the scope of the invention.

Figure 6:
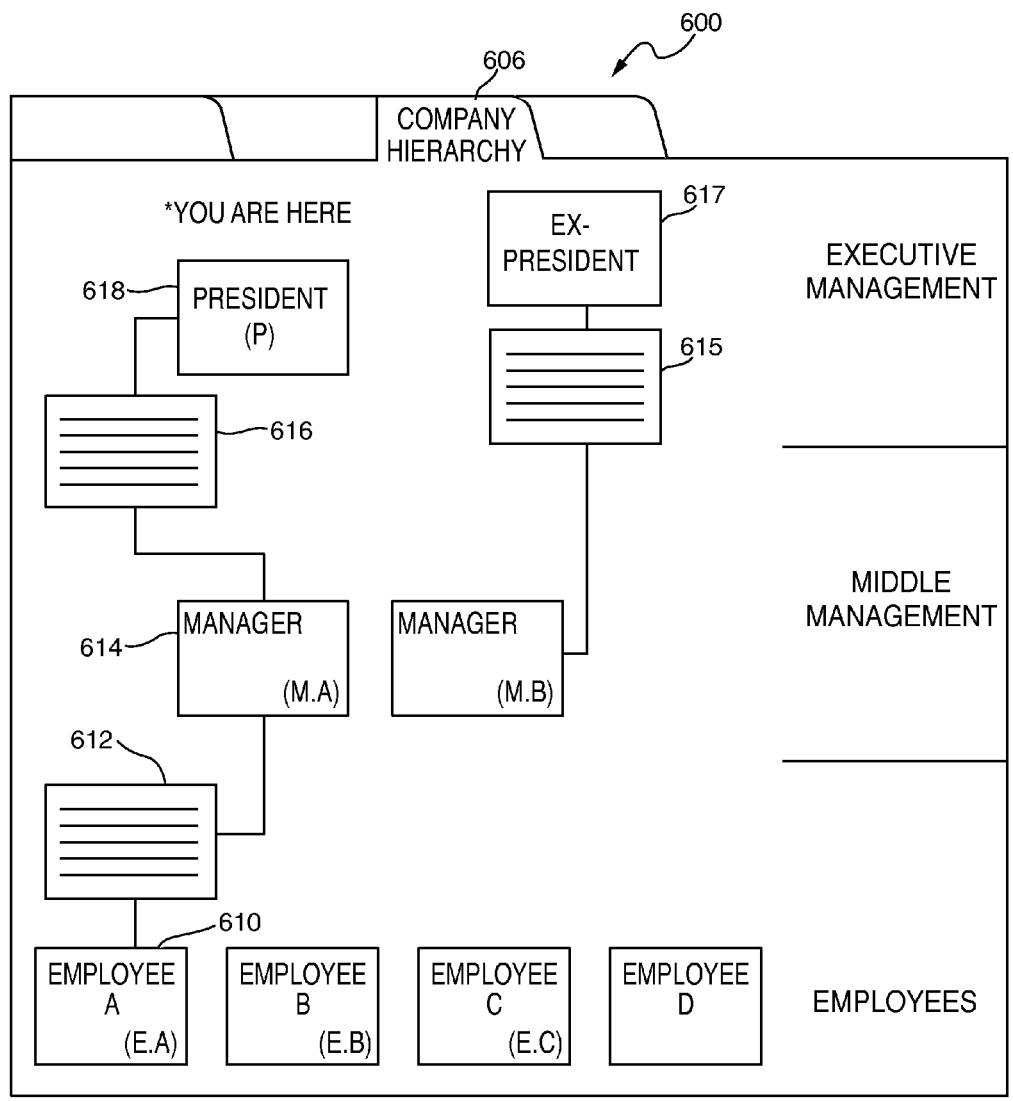
FIG. 6 shows a hierarchical map in accordance with principles of the invention.

FIG. 6 shows an embodiment of an illustrative hierarchal map 600. Map 600 shows an illustrative company hierarchy tab 606.

Map 600 has been divided into three exemplary sections—i.e., executive management, middle management and employees.

President 418 has preferably extended signatory authority for the entity to manager A ("M.A") via document 616. Manager B ("M.B") received signatory authority via document 615 from ex-president 617 who is no longer with the company.

M.A 614 has also extended signatory authority to Employee A ("E.A.") 610 via document 612.

In certain embodiments of the invention, when E.A 610 is removed from signatory authority, the hierarchical map 600 may preferably provide a visual indicator, or plurality of indicators, that E.A 610 derives his authority from M.A 614 and President 618.

Such a chain of authority, as well as the documents upon which the chain is based, may require reexamination in light of selected types of occurrences which caused M.A 610 to lose his signatory authority. For example, if M.A 610 lost his signatory authority because of a fraudulent act, then the chain of authority from which M.A 610 derived his signatory authority may require inspection to insure that M.A 610's fraud was not part of a greater, and more developed fraudulent scheme.

Thus, methods and apparatus for displaying an interactive hierarchical entitlement map are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for providing a hierarchal client entitlement map, the method comprising:
    querying a list of entitlements for a client;
    displaying the list of entitlements for the client, said list comprising a list of signatories with entitlement authorization;
    receiving, from the client, entitlement authorization for a new signatory;
    adding the new signatory to the list of signatories;
    linking the new signatory to one or more signature documents associated with the signatory's authorization;
    receiving a modification to client information;
    transmitting, only if the modification is input by the new signatory, the modification, independent of any human input, to a System of Record; and
    transforming, when received by the System of Record, the client information into updated client information reflecting the modification.

2. The method of claim 1, wherein the new signatory is a first signatory, the method further comprises:
    providing, for the first signatory, a first entitlement level; and
    providing, for a second signatory, a second entitlement level.

3. The method of claim 1 wherein the signatories identified on the list of signatories are authorized to modify client documents.

4. The method of claim 1 wherein the signatories identified on the list of signatories are authorized to submit changes to client documents.

5. The method of claim 1 wherein the modification is transmitted using Straight Through Processing.

6. The method of claim 1 wherein the modification is transmitted without human intervention.

7. The method of claim 1 further comprising transmitting client information in paragraph form.

8. A method for providing signatory maintenance, the method comprising:
    displaying a hierarchal list of signatories with at least one entitlement authorization;
    receiving, from a client, a modification to the at least one entitlement authorization;
    extracting, from one or more client documents, a signature of a new, previously-unentitled, signatory with entitlement authorization; and
    hovering, on a Graphical User Interface ("GUI"), over the new, previously-unentitled, signatory;
    displaying, on a hierarchal display, in response to the hovering:
        a copy of the signature of the signatory;
        a hierarchal list of signatories with current entitlement authorization; and
        a listing of documents signed by each of the signatories.

9. The method of claim 8 further comprising receiving a change in entitlement for a previously-entitled signatory.

10. The method of claim 9, wherein, in response to the change in entitlement for the previously-entitled signatory, the method further comprises removing the previously-entitled signatory as an authorized signor.

11. The method of claim 8 wherein the listing comprises a selectable display of documents signed by the new, previously-unentitled, signatory.

12. An apparatus for providing a hierarchal client entitlement map, the apparatus comprising:
   a processor configured to query a list of entitlements for a client;
   a display configured to display the list of entitlements for the client, said list of entitlements comprising a list of signatories with entitlement authorization;
   a receiver configured to receive:
      from the client, entitlement authorization for a new, previously-unentitled, signatory;
      a request to add the new, previously-unentitled, signatory to the list of signatories; and
      a modification to client information;
   a transmitter configured to transmit, only if the modification to the client information is input by the new, previously-unentitled, signatory, the modification, independent of any human input, to a System of Record; and
   the processor further configured to:
      link the signatory to one or more signature documents associated with the signatory's authorization; and
      transform, when received by the System of Record, the modified client information into updated client information reflecting the modification.

13. The apparatus of claim 12, wherein the signatory is a first signatory, the receiver is further configured to:
   receive, for the first signatory, a first entitlement level; and
   receive, for a second signatory, a second entitlement level.

14. The apparatus of claim 12 wherein the signatories identified on the list of signatories are authorized to modify client documents.

15. The method of claim 12 wherein the signatories identified on the list of signatories are authorized to submit changes to client documents.

16. The apparatus of claim 12 wherein the modification is transmitted using Straight Through Processing.

17. The apparatus of claim 12 wherein the modification is transmitted without human intervention.

18. The apparatus of claim 12 wherein the transmitter is further configured to transmit client information in paragraph form.

* * * * *